3,119,850
LINOLENATE-DERIVED CYCLIC MONOMER FRACTION

Charles R. Scholfield and John C. Cowan, Peoria, and John P. Friedrich, Green Valley, Ill., assignors to the United States of America as represented by the Secretary of Agriculture
No Drawing. Filed May 17, 1962, Ser. No. 195,647
1 Claim. (Cl. 260—405.6)
(Granted under Title 35 U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This application is a continuation-in-part of Serial No. 842,544, filed September 25, 1959, now U.S. Patent No. 3,041,360.

This invention relates to an improved method of preparing the mixture of isomeric cyclic compounds of U.S. Patent No. 3,041,360 formed during a prolonged isomerization of linolenic acid or methyl linolenate in the presence of an alkaline catalyst.

More particularly this invention pertains to a method of obtaining much larger yields of the mixture of isomeric cyclic acids of the previously mentioned patent prepared by reacting an anhydrous medium composed of (1) linseed fatty acids, dried ethylene glycol, and the hygroscopic sodium salt of ethylene glycol or (2) linseed fatty acids, dried tertiary butyl alcohol, and the hygroscopic potassium salt of tertiary butyl alcohol.

The hydrogenated cyclic monomer mixture has remarkable low temperature properties giving it marked commercial utility as a component of low temperature lubricants. Nitrogenous derivatives of the cyclic monomer mixture show desirable plasticizing properties. Alkyd resins incorporating the cyclic monomer mixture show improved nonyellowing properties. The vinyl ester of the hydrogenated cyclic monomer mixture can be copolymerized with vinyl chloride to obtain internally plasticized polyvinyl chloride.

Although the preparation of these cyclic materials was described in Patent No. 3,041,260, we have since unexpectedly found that in an anhydrous solvent and in the presence of (1) the sodium salt of ethylene glycol or (2) the potassium salt of tertiary butyl alcohol the yield of cyclic monomeric acids can be increased from the previously described 29 g. per 100 g. of linseed oil to 44 g. per 100 g. of linseed oil.

The principal object of our invention is the preparation of cyclic acids from linolenic acid (via linseed oil) by the use of an anhydrous solvent and a basic hygroscopic catalyst. In the improved method of the present invention the cyclic acids are produced in better yield and with less polymerization than described in the parent application.

The above and other objects will be apparent in the following detailed disclosure.

We have found that catalyst concentration ranging from 25 to 100 percent excess (excess of that required to produce the salt) are desirable. We have found further that temperatures ranging from 235 to 295° C. give best results.

Although anhydrous tertiary butyl alcohol and anhydrous ethylene glycol have been employed as solvents, other anhydrous solvents familiar to one skilled in the art can be used.

Solvent to fatty acid ratios ranging from 3–1 to 6–1 have been successfully employed.

Our present invention produces acids which contain less hydroxyl than those previously reported and therefore give rise to less polyester (polymer) and correspondingly more cyclic acids.

Using the sodium ethylene glycolate catalyst as an example, one could account for reduced yields of cyclic product, when undried solvents are used, on the basis of the formation of hydroxy acids during the reaction and a resultant high percentage of polymer (polyester) formed.

Example 1

*Preparation of ethylene glycol-sodium salt of ethylene glycol solvent catalyst system.*—96 g. of sodium was dissolved in 2606 g. of ethylene glyocl (previously dried) by adding it slowly with constant stirring to prevent the reaction from becoming too vigorous.

Cyclization of linseed fatty acids: 149 g. of linseed fatty acids were placed in a 2-liter Parr medium pressure stainless steel stirred autoclave. The autoclave was sealed and flushed with nitrogen. Steam was passed through the cooling coil to heat the contents of the bomb and 514 g. of the catalyst solvent reagent was then introduced by siphon action. The bomb was heated to 260° C. and a sample taken at 3 hours. The pressure was 140 p.s.i.g. The sample was diluted with 2–3 volumes of water, and heptane added. The mixture was then acidified and the heptane layer washed 3 times with water. The heptane was stripped off yielding 43.6 g. of crude acids. Vacuum distillation of these acids yielded 38.15 g. of monomer and 15.3 g. of polymer.

Hydrogenation of the monomer fraction with a palladium or carbon catalyst followed by crystallization from acetone of the straight chain saturates at −60° C., yielded 18.7 g. of cyclic acids (43.2 percent yield based on recovered crude acids).

Example 2

*Cyclization of linseed fatty acids.*—25 g. of linseed fatty acids, 12.5 g. of anhydrous potassium tertiary butoxide, and 175 ml. of anhydrous tertiary butyl alcohol were placed in a covered Erlenmeyer flask and heated to effect solution. The mixture was transferred to a 300 ml. stainless steel rocker bomb and flushed with $N_2$. The bomb was heated to 237° C. and maintained at this temperature for 5 hours. The pressure at this temperature was 500 p.s.i.g. After cooling contents of the bomb was dissolved in water, acidified with $H_2SO_4$ and extracted with ether. The ether layer was washed with water several times, dried and stripped of solvent. 20.5 g. of the residual crude acids were distilled under vacuum, yielding 19.2 g. of distillate and 1.3 g. of polymer.

15 g. of the distillate was hydrogenated with a palladium on carbon catalyst. The resulting straight-chain saturates were crystallized from acetone at −60° C. yielding 7 g. of cyclic acids (44 percent yield based on recovered crude acids).

Having thus disclosed our invention, we claim:

A method for producing a mixture of cyclic monomeric acid isomers comprising reacting, under anhydrous conditions, a member of the group consisting of linolenic acid and methyl linolenate with at least 25% excess above that required for salt formation of a member of the group consisting of the sodium salt of anhydrous ethylene glycol and the potassium salt of anhydrous tertiary butyl alcohol for at least about 3 hours at a temperature of about from 235° to 295° C.

References Cited in the file of this patent

UNITED STATES PATENTS

| | | |
|---|---|---|
| 2,242,230 | Burr | May 20, 1941 |
| 2,389,795 | Luaces | Nov. 27, 1945 |
| 3,005,840 | Beal | Oct. 24, 1961 |

OTHER REFERENCES

Herb et al.: J. Am. Oil Chemists Soc. 24, 556–561 (1952).